Patented June 22, 1954

2,681,901

UNITED STATES PATENT OFFICE 2,681,901

GLYCIDYL-POLYETHER RESIN-FORMING COMPOSITIONS CONTAINING AMINE SALTS OF FATTY ACIDS

Quentin T. Wiles, Lafayette, and Daniel W. Elam, Berkeley, Calif., assignors to Shell Development Company, Emeryville, Calif., a corporation of Delaware No Drawing. Application October 3, 1951, Serial No. 249,624

5 Claims. (Cl. 260—47)

This invention relates to a resin-forming composition. More particularly, the invention pertains to a composition comprising a glycidyl ether in admixture with a particular proportion of an amine salt of a fatty acid.

Prior to the present invention, glycidyl polyethers have been cured to resinous products with the aid of amines. Thus upon mixing an amine with a glycidyl polyether, a composition is obtained which resinifies in a relatively short time even when not heated. Owing to the inherent tendency of such composition to resinify spontaneously, there is no control over the time of resinification. This lack of control over the time of resinification has greatly limited the practical use of the prior compositions because of necessity of molding, spreading or otherwise forming the compositions into a desired shape before resinification occurs. The resinification is irreversible and the resinified compositions cannot be returned to a plastic condition permitting shaping or spreading. We have now discovered a means of overcoming this serious fault of the prior compositions.

In brief, our invention is a composition comprising a fatty acid salt of an amine in admixture with a glycidyl ether having a 1,2-epoxy equivalency greater than 1.0, the proportion of the salt in the mixture being such that there is present 0.05 to 0.85 amino nitrogen atoms per epoxide group. If desired, the composition may contain two or more different fatty acid salts of amines. Upon heating the composition to an elevated temperature, the lower limit of which will vary to some extent with the particular salt, the glycidyl ether and the concentration of salt, the composition resinifies. However, when the salt is neutral and is also free of other chemical groups reactive with the epoxide groups contained in the glycidyl ether, the composition is stable against resinification for an indefinite period of time at ordinary atmospheric temperature below about 40° C. This composition of the invention, therefore, effectively overcomes the fault of premature resinification of prior compositions containing free amines as curing agent. Furthermore, even when our composition contains a fatty acid salt of an amine, and the salt is not neutral and/or contains another group, such as a phenolic hydroxyl group, etc., which is reactive with the epoxide groups contained in the glycidyl ether, the tendency of the composition to resinify spontaneously at ordinary temperature is greatly lessened as compared to a corresponding composition containing the free amine rather than its fatty acid salt. Thus the invention provides means for complete control over time of resinification.

We have also discovered that by having the proportion of the fatty acid salt of an amine in admixture with the glycidyl ether such that there is present 0.05 to 0.85 amino nitrogen atoms per epoxide group in the composition, the character and properties of resinified product is vastly different from the resin from compositions containing a proportion of salt outside this stated range. If the proportion of salt is such that there is less than 0.05 amino nitrogen atoms per epoxide group, the composition does not cure by heating to a useful resin which is insoluble in organic solvents such as toluene. Similarly, if the proportion of salt is such that there is greater than 0.85 amino nitrogen atoms per epoxide group, heating the composition gives a product which is also not insoluble in an organic solvent such as toluene. The desirability of being able to obtain a resinous product from the composition that is fully cured so as to be insoluble in organic solvents is evident from the fact that the composition of the invention is useful in the manufacture of adhesives, varnishes, enamels, casting compositions, potting compounds, and molded articles of manufacture. While the desired property of the cured composition being insoluble in organic solvents is obtained from the composition containing such a proportion of the salt that there is present in the mixture 0.05 to 0.85 amino nitrogen atoms per epoxide group, it is preferred in order to realize best results that the proportion of salt be narrower within the indicated range and such that there is present in the mixture from about 0.07 to 0.3 amino nitrogen atoms per epoxide group.

The resin-forming constituent in the composition of the invention is a glycidyl ether having a 1,2-epoxy equivalency greater than 1.0. By the 1,2-epoxy equivalency, reference is made to the average number of 1,2-epoxy groups

contained in the average molecule of the glycidyl ether. In the case where a substantially pure, simple compound is used, the epoxy equivalency will be an integer of two or more. For example, the epoxy equivalency of diglycidyl monoether or of diglycidyl diether of ethylene glycol is 2.0 while that of the triglycidyl triether of glycerol is 3.0. More generally, however, the 1,2-epoxy equivalency is not a simple integer of 2.0 or more because of the usual method of preparation of the glycidyl ethers and the fact that they are ordinarily a mixture of chemical compounds having somewhat different molecular weights and contain a very minor proportion of compounds wherein the terminal glycidyl radicals are in hydrated form. This is true of glycidyl polyethers of polyhydric phenols or of polyhydric alcohols used in the invention. Thus the 1,2-epoxy equivalency of glycidyl polyether of a dihydric phenol or dihydric alcohol is a value between 1.0 and 2.0. Nevertheless, the epoxy equivalency in all cases for the glycidyl ether is greater than 1.0.

The 1,2-epoxide value of the glycidyl ether is determined by heating a weighed sample of the ether with an excess of 0.2 N pyridinium chloride in chloroform solution at the boiling point under reflux for two hours whereby the pyridinium chloride hydrochlorinates the epoxy groups to chlorhydrin groups. After cooling, the excess unreacted pyridinium chloride is back-titrated with 0.1 N sodium hydroxide in methanol to the phenolphthalein end point. This method was used for obtaining all epoxide values discussed herein.

The 1,2-epoxy equivalency and its significance will be better understood by considering an example. The glycidyl polyether of 2,2-bis(4-hydroxyphenyl)propane designated herein as Polyether A has a measured epoxy value of 0.50 epoxy equivalents per 100 grams and a measured molecular weight of 370. Therefore, the 1,2-epoxy equivalency of Polyether A is 1.85. Assume that it is desired to prepare a composition containing Polyether A in admixture with the diethylenetriamine dibutyrate salt obtained by reacting one mol of diethylenetriamine with two mols of butyric acid, and that it is desired the composition to contain such a proportion of this partially neutralized salt that there is present 0.2 amino nitrogen atoms per epoxide group. The molecular weight of the salt is 279 and each molecule thereof contains three amino nitrogen atoms, the total of the amino nitrogen atoms being taken into account whether present in the salt as un-neutralized amino groups or as salt groups. Each 100 parts by weight of Polyether A is therefore mixed with $0.2 \times 279/3 \times 0.5/100 \times 100 = 9.3$ parts of salt. In other words, the composition contains 8.5 per cent by weight of the salt, or expressed differently, contains 0.123 mol of the salt per mol of Polyether A.

The glycidyl ethers used in the invention preferably contain only the elements carbon, hydrogen, oxygen and halogen. They include the simple monoether containing a single ethereal oxygen atom (aside from the epoxide groups) such as diglycidyl monoether as well as polyethers such as diglycidyl diether of ethylene glycol, propylene glycol, trimethylene glycol, diethylene glycol, triethylene glycol, glycerol and the like. Other typical glycidyl ethers of the class include compounds containing more than two glycidyl groups linked by ether oxygen atoms to an aliphatic radical such as polyglycidyl polyethers of glycerol, diglycerol, erythritol, pentaglycerol, pentaerythritol, mannitol, sorbitol, polyallyl alcohol, polyvinyl alcohol, and the like. All of such glycidyl ethers have a 1,2-epoxy equivalency greater than 1.0, and can be prepared by the method described in U. S. Patent No. 2,538,072.

It is in general preferred that the resin-forming constituent be a glycidyl polyether of a polyhydric phenol, including pyrogallol and phloroglucinol, but particularly of a dihydric phenol. Such polyethers are obtained by heating the dihydric phenol with epichlorhydrin at about 50° C. to 150° C. using 1 to 2 or more mols of epichlorhydrin per mol of dihydric phenol. Also present is a base, such as sodium or potassium hydroxide in slight stoichiometric excess to the epichlorhydrin, i. e., about 2% to 30%. The heating is continued for several hours to effect the reaction and the product is then washed free of salt and base. The product, instead of being a single simple compound, is generally a complex mixture of glycidyl polyethers, but the principal product may be represented by the formula

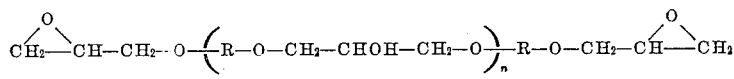

wherein $n$ is an integer of the series 0, 1, 2, 3 . . ., and R represents the divalent hydrocarbon radical of the dihydric phenol. While for any single molecule of the polyether $n$ is an integer, the fact that the obtained polyether is a mixture of compounds causes the determined value for $n$, e. g., from molecular weight measurement, to be an average which is not necessarily zero or a whole number. Although the polyether is a substance primarily of the above formula, it may contain some material with one or both of the terminal glycidyl radicals in hydrated form, and therefore, the 1,2-epoxy equivalency approaches, but is not equal to 2.0; it is a value between 1.0 and 2.0.

The simplest of such polyethers is the diglycidyl diether of a dihydric phenol. It contains a single divalent aromatic hydrocarbon radical from the dihydric phenol and has two glycidyl radicals linked thereto by ethereal oxygen atoms. More generally, the polyether of dihydric phenols is of more complex character and contains two or more aromatic hydrocarbon radicals alternating with glyceryl groups in a chain which are linked together by intervening ethereal oxygen atoms.

Any of the various dihydric phenols is used in preparing the polyethers including mononuclear phenols such as resorcinol, catechol, hydroquinone, methyl resorcinol, etc.; or polynuclear phenols like 2,2 - bis(4-hydroxyphenyl)propane which is termed bis-phenol herein for convenience, 4,4' - dihydroxybenzophenone, bis(4 - hydroxyphenyl)methane, 1,1 - bis(4 - hydroxyphenyl)ethane, 1,1 - bis(4-hydroxyphenyl)isobutane, 2,2-bis(4-hydroxyphenyl)butane, 2,2-bis(4-hydroxy-2-methylphenyl)propane, 2,2-bis(4-hydroxy-2-tertiary-butylphenyl)propane, 2,2-bis(2-hydroxynaphthyl)pentane, 1,5 - dihydroxynaphthalene, etc.

Particularly preferred polyethers are prepared from 2,2-bis(4-hydroxyphenyl)propane. They contain a chain of alternating glyceryl and 2,2-bis(4-phenylene)propane radicals separated by intervening ethereal oxygen atoms and have a 1,2-epoxy equivalency between 1.0 and 2.0, as well as, preferably, a molecular weight of about 340 to 1000, and an epoxide equivalent weight of about 170 to 500. The epoxide equivalent weight is the weight of glycidyl polyether per epoxide group.

The glycidyl polyethers of polyhydric phenols will be more fully understood from consideration of the following decribed preparations and the properties of the products. The parts are by weight.

POLYETHER A

Bis-phenol is dissolved in epichlorhydrin in the proportion of 5,130 parts (22.5 mols) of bis-phenol in 20,812 parts (225 mols) of epichlorhydrin and 104 parts of water. The solution is prepared in a kettle provided with heating and cooling equipment, agitator, distillation condenser and receiver. A total of 1880 parts of solid 97.5% sodium hydroxide, corresponding to 2.04 mols of sodium hydroxide per mol of bis-phenol (2% excess) is added in installments. The first installment of 300 parts of soduim hydroxide is added and the mixture heated with efficient agitation. The heating is discontinued as the temperature reaches 80° C. and cooling is started in order to remove the exothermic heat of reaction. The control is such that the temperature rises only to about 100° C. When the exothermic reaction has ceased and the temperature has fallen to 97° C., a further addition of 316 parts of sodium hydroxide is made and similar further additions are effected at successive intervals. An exothermic reaction takes place after each addition. Sufficient cooling is applied so there is gentle distillation of epichlorhydrin and water, but the temperature is not allowed to go below about 95° C. No cooling is necessary after the final addition of sodium hydroxide. After the last addition of sodium hydroxide with completion of the reaction, the excess epichlorhydrin is removed by vacuum distillation with use of a kettle temperature up to 150° C. and a pressure of 50 mm. Hg. After completion of the distillation, the residue is cooled to about 90° C. and about 360 parts of benzene added. Cooling drops the temperature of the mixture to about 40° C. with precipitation of salt from the solution. The salt is removed by filtration and the removed salt carefully washed with about an additional 360 parts of benzene to remove polyether therefrom. The two benzene solutions are combined and distilled to separate the benzene. When the kettle temperature reaches 125° C., vacuum is applied and distillation continued to a kettle temperature of 170° C. at 25 mm. pressure. The resulting glycidyl polyether of bis-phenol as a Durran's mercury method softening point of 9° C., an average molecular weight of 370 by ebullioscopic measurement in ethylene dichloride, and an epoxide value of 0.50 epoxy equivalents per 100 grams. It has an epoxide equivalent weight of 200 and a 1,2-epoxy equivalency of 1.85. The product is designated herein as Polyether A.

POLYETHER B

A solution consisting of 11.7 parts of water, 1.22 parts of sodium hydroxide, and 13.38 parts of bis-phenol was prepared by heating the mixture of ingredients to 70° C. and then cooling to 46° C. at which temperature 14.06 parts of epichlorhydrin were added while agitating the mixture. After 25 minutes had elapsed, there was added during an additional 15 minutes' time a solution consisting of 5.62 parts of sodium hydroxide in 11.7 parts of water. This caused the temperature to rise to 63° C. Washing with water at 20° C. to 30° C. temperature was started 30 minutes later and continued for 4½ hours. The product was dried by heating to a final temperature of 140° C. in 80 minutes, and cooled rapidly. At room temperature, the product was an extremely viscous, semi-solid having a softening point of 27° C. by Durran's mercury method, an epoxide equivalent weight of 245 and a molecular weight of 460. The 1,2-epoxy equivalency was 1.88. This product will be referred to hereinafter as Polyether B.

POLYETHER C

Polyethers of higher molecular weight are prepared by using smaller ratios of epichlorhydrin to bis-phenol. In a vessel fitted with an agitator, 228 parts (1 mol) of bis-phenol and 75 parts (1.88 mols) sodium hydroxide as a 10% aqueous solution are introduced and heated to about 45° C. whereupon 145 parts (1.57 mols) of epichlorhydrin are added rapidly while agitating the mixture. The temperature of the mixture is then gradually increased and maintained at about 95° C. for 80 minutes. The mixture separates into a two-phase system and the aqueous layer is drawn off from the taffy-like product which forms. The latter is washed with hot water while molten until the wash water is neutral to litmus. The product is then drained and dried by heating to a final temperature of 130° C. The softening point of the resulting glycidyl polyether is 70° C. The measured molecular weight of the product is 900 and it has an epoxide value of 0.20 epoxy equivalents per 100 grams. The epoxide equivalent weight is 500 and the 1,2-epoxy equivalancy is 1.8. It will be identified hereinafter as Polyether C.

POLYETHER D

This glycidyl polyether is prepared in like manner to that of Polyether C except that for each mol of bis-phenol there is employed 1.22 mols of epichlorhydrin and 1.37 mols of sodium hydroxide. The resulting polyether has a softening point of 98° C. by Durran's mercury method, a molecular weight of 1400 as measured ebullioscopically in ethylene dichloride, and an epoxide value of 0.11 epoxy equivalents per 100 grams. The epoxide equivalent weight is 910, and the 1,2-epoxy equivalency is 1.54.

POLYETHER E

Glycidyl polyethers of still higher molecular weight are most easily prepared by heating together and reacting a lower polyether with additional dihydric phenol. Thus 100 parts of Polyether D are heated to 150° C., and then 5 parts of bis-phenol are added. The heating is continued for about two hours while stirring the reaction mass and gradually increasing the temperature to about 200° C. The resulting product has a softening point of 131° C., a molecular weight of 2900, an epoxide value of 0.05 epoxy equivalents per 100 grams, an epoxide equivalent weight of 2000, and a 1,2-epoxy equivalency of 1.45.

The amine salt of a fatty acid which functions as a heat-activated curing agent for the resin-forming glycidyl ether in the composition of the invention is obtained by neutralizing or partially neutralizing an amine with a fatty acid. The salt can be neutral by combining with a mol of amine, the same number of mols of fatty acid as there are amino groups in the amine. Thus the neutral salt of ethylene diamine and acetic acid is obtained by neutralizing one mol of the amine with two mols of acetic acid. The use of such neutral salts is particularly advantageous in the composition because the mixture is resistant against gelation at ordinary temperature for very long periods of time, but resinifies upon being heated to activating temperature. However, partially neutralized salts are also suitable although compositions containing them are not as resistant against gelation at ordinary temperature as when neutral salts are employed. Nevertheless, the time for gelation is unexpectedly greater with partially neutralized salts than in compositions containing the free amine. It is preferable that the partially neutralized salt be of non-acidic variety as is the case, for example, with the salt obtained by reacting one mol of ethylene diamine with one mol of acetic acid.

It appears that the fatty acid salt of any amine is suitable. It has been found, however, that best results are obtained with the salts of amines which have the amino group or groups linked only to non-aromatic carbon atoms. The amine contains one or more primary, secondary and/or tertiary amino groups. Particularly good results have been obtained with tertiary amines having each of the three bonds of each amino nitrogen atom linked to different carbon atoms wherein at least two of the carbon atoms are those of methyl groups as is the case, for example, with the valeric acid salt of benzyldimethylamine. It is not essential that the salt be free of other groups, including groups reactive with epoxide groups contained in the glycidyl ether, than the amino-carboxylic acid salt group. Thus a particularly preferred salt used in the composition of our invention is one containing a free phenolic hydroxyl group which is obtained by mixing and reacting one mol of 2,4,6-tri(dimethylaminomethyl)phenol (see U. S. Patent No. 2,220,834) and three mols of 2-ethylhexoic acid. It is also of value to note that our invention makes possible a practical means of employing normally gaseous amines as is the case with fatty acid salt of methylamine, dimethylamine or trimethylamine. Owing to the fact that these amines are gaseous at even room temperature of say 20° C., their use heretofore has not been practicable. All of the salts employed in the composition of our invention are either liquids or solids at room temperature.

Representative examples of amines employed as fatty acid salts in the invention include such compounds as methylamine, dimethylamine, trimethylamine, ethylamine, diethylamine, triethylamine, ethanolamine, triethanolamine, 2-chlorethylamine, diisopropylamine, hexylamine, diethylenetriamine, 1,3 - propanediamine, N,N-diethyl-1,3-propanediamine, cetyldimethylamine, nonylamine, hexamethylenediamine, morpholine, N-butylmorpholine, aniline, N,N-dimethylaniline, benzylamine, benzyldimethylaniline, dimethylaminomethylphenol, tri(dimethylaminomethyl)phenol, chloraniline, pyrrole, pyridine, piperidine, pyrimidine, piperazine and the like. The amine may contain any number of nitrogen atoms.

The heat-activated salt employed in the invention can be an amine salt of any fatty acid although the salt of a fatty acid containing 2 to 12 carbon atoms in acid portion of the molecule is preferred. Thus the fatty acid can be saturated, olefinically unsaturated and/or acetylenically unsaturated. The fatty acid has the carboxyl group linked to hydrogen or an aliphatic hydrocarbon radical. The fatty acids include, for example, such representative compounds as formic acid, acetic acid, propionic acid, acrylic acid, propiolic acid, butyric acid, isobutyric acid, valeric acid, caproic acid, caprylic acid, capric acid, 2-ethylhexoic acid, lauric acid, sorbic acid, myristic acid, palmitic acid, stearic acid, behenic acid, oleic acid, linoleic acid, linolenic acid, and the like, as well as mixtures thereof. Best results are obtained with amine salts of a fatty acid which has the carboxyl group linked to a saturated aliphatic hydrocarbon as is the case with saturated fatty acid salts of amines. The invention includes, but is not limited to, employing salts of any of the above particular acids with any of the aforenamed particular amines.

The salts are prepared by mixing the amine with the fatty acid in that order or vice versa. The desired salt forming reaction occurs upon mere bringing together and mixing the amine and acid. It is often convenient to effect the mixing in the absence of a solvent although a solvent for either the amine, the acid, or both can be employed if desired. The art of preparing amine salts of fatty acids is so simple and well known that further description on the subject is not necessary. It may be remarked, however, that the salts are formed without heat addition, and preferably with cooling in order to avoid amide formation by chemical dehydration. An amide requires markedly higher temperature to cure glycidyl ethers than does the corresponding salt, and furthermore, it effects the cure by an entirely different chemical mechanism than is the case with the fatty acid salt of an amine.

The composition of the invention is prepared by mixing the salt and glycidyl ether together. The particular technique employed for this purpose will vary to some extent depending primarily upon the fluidity of the glycidyl ether at ordinary or slightly elevated temperature which is below the temperature which activates the salt so as to cause it to gel the glycidyl ether. Thus in preparing a composition from Polyether A, the salt can be stirred directly into the polyether at ordinary temperature of say 20° C. to 25° C. because the polyether has adequate fluidity at this temperature. With less fluid substances such as Polyether B, it is convenient to heat the polyether to about 40° C. in order to obtain sufficient fluidity to permit easy incorporation of the salt. With solid or very viscous glycidyl ether, a solvent is conveniently used. A variety of substances are suitable for this purpose, including ketones such as acetone, methyl ethyl ketone, methyl isobutyl ketone, isophorone, diacetone alcohol, etc.; ether alcohols such as methyl, ethyl or butyl ether of ethylene glycol or diethylene glycol; and chlorinated solvents such as trichloropropane, chloroform, etc. In compounding the glycidyl ether with the salt, trouble is sometimes encountered in obtaining a completely homogeneous mixture. This is seldom harmful, but can be avoided by including a small amount of water in the composition or solution thereof such as about 0.2 to 1%.

Solvent-free compositions suitable for molding operations and the like are obtained with use of a volatile solvent which is evaporated from a solution of the composition containing glycidyl ether and the salt. The evaporation is effected at a temperature below that which activates the salt curing agent, and premature gelation is thus avoided. A temperature below about 50° C. is satisfactory for this purpose.

It is also possible to compound compositions from normally solid glycidyl ether by milling at elevated temperature which is at or above the activation temperature of the salt provided the milling is effected rapidly with cooling as soon as possible thereafter before any or appreciable curing occurs.

The composition of the invention cures to a hard resinous material in short time upon being heated at least up to the activating temperature of the salt. This minimum temperature will vary somewhat with the particular salt contained in the composition. Thus a composition containing some salts gives a very tight cure as low as 50 to 65° C., but other salts require higher temperatures. Ordinarily temperatures above about 250° C. are avoided owing to decomposition of the materials. As a general matter, the composition is cured at a temperature of about 80° C. to 200° C. As the curing temperature is increased, the time required to obtain a tight cure is decreased. For example, with a composition containing 100 parts of Polyether A mixed with 10.5 parts of the salt made by reacting one mol of 2,4,6-tri(dimethylaminomethyl)phenol with 3 mols of 2-ethylhexoic acid, a tight cure is obtained in 12 hours at 50° C., in 3 hours at 60° C., and in 1.5 hours at 65° C. Use of longer times than the minimum at a particular activating temperature may be employed if desired, but it is usually preferred for the purpose of efficiency that the time of cure be kept as short as possible. The time of cure is thus correlated with the temperature. It is not known exactly how the salt functions in effecting the cure. It may dissociate into free amine and free acid at the curing temperature. However, the free acid is retained permanently in the composition upon curing. Even with salts containing a large proportion of fatty acid as the amine salt thereof, it was surprising to discover no adverse effect on the resinous product although free fatty acids are known to be very reactive with glycidyl ethers.

The resulting cured resinous product is very valuable in being a hard tough material resistant against the destructive action of organic solvents and alkalies. The composition of the invention is thus suitable for use in a variety of applications as was stated earlier herein. Depending upon the particular application to which the composition is put, the composition may also contain, besides the glycidyl ether and the salt, various other materials such as pigments, fillers, plasticizers, and other resins.

The invention is illustrated in the following examples, but is not to be construed as limited to details described therein. The parts and percentages are by weight.

EXAMPLE 1

A series of fatty acid salts of 2,4,6-tri(dimethylaminomethyl)phenol, described in U. S. Patent No. 2,220,834, were prepared by mixing the amine with the acid in the ratio of 3 mols of acid per mol of amine. The salts, along with a blank of the free amine, were mixed with Polyether A in such proportion that there was present in each composition 0.113 amino nitrogen atoms per epoxide group in the polyether regardless of whether the amine was present as salt or as free amine. Observations were made of the time of gelation at room temperature (about 25° C.) and at several elevated temperatures, and portions of the original compositions were also cured in an air oven set at elevated temperatures to hard resins with determinations being made of the Barcol hardness. The results are summarized in Table I below.

*Table I*

| Amine or Salt | Gel Time at Room Temp. | Gel Time and Cures | | | | | |
|---|---|---|---|---|---|---|---|
| | | 60° C. | | 70° C. | | 80° C. | |
| | | Gel Time | Barcol Hardness | Gel Time, Min. | Barcol Hardness | Gel Time, Min. | Barcol Hardness after 1 Hr. |
| Free amine | 80 min | 40 min | 25 after 2 hrs | 25 | 32 after 1.5 hrs | 15 | 30 |
| Formate | >48 hrs | | | | | 70 | |
| Acetate | >18 hrs | >2.5 hrs | | | | 45 | 26 |
| Propionate | do | >75 hrs | 27 after 18 hrs | | | 25 | 25 |
| Butyrate | >24 hrs | 2 hrs | 23 after 3.5 hrs | 45 | 25 after 1.5 hrs | 17 | 25 |
| Isobutyrate | >18 hrs | do | 30 after 3 hrs | 45 | 32 after 1.5 hrs | 17 | 25 |
| Valerate | do | do | 15 after 3.5 hrs | 50 | 30 after 1.5 hrs | 20 | 28 |
| Isovalerate | do | 1.75 hrs | 20 after 3.5 hrs | 55 | 25 after 1.5 hrs | 17 | 27 |
| Caproate | do | 2.25 hrs | | | | 15 | 20 |

EXAMPLE 2

The extent of "tightness" of cure of glycidyl ethers having a 1,2-epoxy equivalency greater than 1.0 can be determined accurately by subjecting the formed resin to a thermal shock test. The glycidyl ether in admixture with the curing agent is placed in a cup having the shape of a truncated cone that is made of paper. A one-half inch steel cube is suspended by a copper wire in the center of the resin-forming composition and the assembly is placed in an air oven for the desired time and temperature to resinify the composition. The paper cup is removed and the resin sample is obtained having a truncated cone shape of about two inches high with a lower diameter of about 1½ inches and an upper diameter of about 1¼ inches.

The resin sample containing the steel cube is subjected to repeated variations of low and high temperatures. The fully cured resin has very high inherent strength, but if not fully cured, cracks will appear owing to the fact that the strains set up by the difference in thermal expansion of the steel cube and the resin are greater than the strength of the resin.

The thermal shock test is performed by thrusting the resin sample into crushed Dry Ice (solid carbon dioxide) for an hour where the temperature reaches about —70° C. The sample is then removed and allowed to warm up by standing in open air at room temperature for one hour. The sample is inspected for cracks, and if none are present, the cycle is repeated twice. If no cracks appear after three low temperature treatments, the sample is then placed in an oven containing circulating air set at 100° C. for an hour after which it is removed and allowed to cool in open air at room temperature for an hour. The 100° C. treatment is repeated once again with inspection for cracks upon completion. The same sample is next subjected to exposure to oven heat at 150° C. for an hour followed by cooling at room temperature for one hour, and then this treatment is repeated. Finally, the resin sample is given the same treatment twice in the oven set at 200° C. Fully cured resin will pass this severe thermal shock test, but insufficiently cured material will not.

The above-described thermal shock test was used on resin samples obtained by subjecting compositions containing various percentages of tri(dimethylaminomethyl)phenol triisobutyrate mixed with Polyether A which had been subjected to various times and temperatures of cure. The results are given in Table II below.

Table II

| Added Percent Amine Salt | Cure Conditions | Cycles Passed Before Failure | | | |
|---|---|---|---|---|---|
| | | In Dry Ice | at 100° C. | at 150° C. | at 200° C. |
| 6 | 1 hr. at 65° C | cracked in 1st cycle | | | |
| | 2 hrs. at 65° C | 3 | 2 | 2 | cracked in 1st cycle. |
| | 2 hrs. at 60° C | 3 | 2 | cracked in 2nd cycle | |
| 8 | 1 hr. at 65° C | 3 | 2 | 2 | cracked in 2nd cycle. |
| | 2 hrs. at 65° C | 3 | 2 | 2 | 2T*. |
| | 2 hrs. at 60° C | 3 | 2 | cracked in 2nd cycle | |
| 10 | 1 hr. at 65° C | 3 | 2 | 2 | 2T. |
| | 2 hrs. at 65° C | 3 | 2 | 2 | 2T. |
| 12 | 1 hr. at 65° C | 3 | 2 | 2 | 2T. |
| | 2 hrs. at 65° C | 3 | 2 | 2 | 2T. |
| 14 | 1 hr. at 65° C | 3 | 2 | 2 | 2T. |
| | 2 hrs. at 65° C | 3 | 2 | 2 | 2T. |

* T=Test terminated without failure appearing.

The foregoing results demonstrate the critical character of the proportion of salt in admixture with the glycidyl polyether in the composition of the invention. It is seen that upon heating the compositions containing 0.07 to 0.098 mol of the salt per mol of the polyether (added 10 to 14% amine salt), a tight cure is obtained in 1 to 2 hours at 65° C. In other words, compositions containing salt in such proportion that there is present 0.11 to 0.16 amino nitrogen atoms (as salt groups) per epoxide group give excellent resins upon cure, while the composition containing an 0.09 atom proportion is marginal and that containing an 0.07 atom proportion does not give a tight cure under the noted curing conditions. It is also to be pointed out that use of much higher proportions of salts in the compositions are entirely unsuitable, though for another reason. Thus compositions containing proportions which equal or approximate equimolecular amounts of salt and glycidyl polyether result in formation of resins which are so soft, regardless of curing conditions, that their hardness cannot be measured with the Barcol hardness instrument. Consequently, such compositions are entirely lacking in utility.

EXAMPLE 3

A salt was prepared by neutralizing 1 mol of 2,4,6 - tri(dimethylaminomethyl)phenol with 3 mols of 2-ethylhexoic acid. The salt was liquid at about 25° C. A composition was prepared by mixing 10.5 parts of the salt with 100 parts of Polyether A. At room temperature of about 25° C., it required 2 hours for the composition to increase in viscosity to 100,000 centipoises, and after 24 hours' total time, raising the temperature to 65° C., gave a viscosity of 4880 centipoises at this temperature. The composition was easily pourable at this temperature, but the viscosity rapidly increased so as to reach 29,600 centipoises at 65° C. in ½ hour at this temperature.

By contrast, another composition containing Polyether A in admixture with the free amine, 2,4,6 - tri(dimethylaminomethyl)phenol, rather than the caprylic acid salt thereof, the amine being present in such proportion that the same ratio of amino nitrogen atoms per epoxide group (0.09 atom per group) was present as in the above-described composition containing the salt. Upon allowing this composition to stand at room temperature of about 25° C., it was found that its viscosity increased to 100,000 centipoises at that temperature in only 30 minutes. Furthermore, at the same temperature, the composition became very thick in 4 hours (viscosity unmeasurably high), and that it gelled hard in less than 18 hours (some time between 4 hours and 18 hours).

A fresh composition was prepared which also contained 10.5 parts of the above-described 2-ethylhexoic acid salt of 2,4,6-tri(dimethylaminomethyl)phenol in admixture with 100 parts of Polyether A. Portions of the composition were poured into the truncated cone molds containing the steel cube suspended therein described in Example 2, and were baked in an air oven for the times and temperatures noted in the table below. The resinous products were then subjected to the thermal shock test also described in Example 2. The results are given in the following table.

Table III

| Cure Conditions | Cycles Passed Before Failure | | | |
|---|---|---|---|---|
| | In Dry Ice | at 100° C. | at 150° C. | at 200° C. |
| 2 hrs. at 60° C | cracked in 2d cycle | | | |
| 1 hr. at 65° C | cracked in 1st cycle | | | |
| 1.5 hrs. at 65° C | 3 | 2 | 2 | 2T* |
| 2 hrs. at 65° C | 3 | 2 | 2 | 2T |
| 3 hrs. at 65° C | 3 | 2 | 2 | 2T |

*T=Test terminated without failure appearing.

EXAMPLE 4

Using the salt prepared by neutralizing one mol of 2,4,6 - tri(dimethylaminomethyl)phenol with three mols of 2-ethylhexoic acid, a composition was prepared by mixing 37 parts of Polyether A with 69.7 parts of the salt (equimolecular proportions). The composition was heated at 65° C. for 1.5 hours. Upon cooling to room temperature, the product was still of very sticky consistency and still soft. The glycidyl polyether was not cured because the sticky product was completely soluble in toluene at room temperature.

Another composition was prepared by mixing 37 parts of Polyether A with 34.8 parts of the same salt described for the first composition. This second composition contained about one-half as much salt as the first, and had the salt present in such proportion that the composition contained 0.81 amino nitrogen atoms per epoxide group. Upon heating this second composition to 65° C., it was found that the composition gelled and resinified in 1 hour to a product which was hard. Furthermore, the glycidyl polyether had cured because the resinous product was insoluble in toluene both at room temperature and at about 100° C.

EXAMPLE 5

Trimethylamine isobutyrate was prepared by bubbling gaseous trimethylamine through liquid isobutyric acid held at 0° C. until the acid was neutralized. To 100 parts of Polyether A, there were added 12.5 parts of the salt so the composition contained about 0.17 amino nitrogen atom per epoxide group. Portions of the composition were heated at several temperatures for determination of gel times, and the heating was continued in order to cure the composition with observations being made of the Barcol hardness of the resulting resin. When heated at 60° C., gelation took longer than 2.5 hours and the resin after 18 hours heating had a Barcol hardness of 27. At 65° C. the gel time was 2¾ hours, and the resin formed after 18 hours had a Barcol hardness of 23. By heating at 70° C., the gel time was reduced to 1 hour and 50 minutes, and the resin after 2½ hours heating had a Barcol hardness of 14. Upon being heated at 80° C., the composition gelled hard in 53 minutes, and the resin resulting after 2½ hours heating had a Barcol hardness of 11.

EXAMPLE 6

The neutral dimethylamine salt of acetic acid was prepared, and 11.7 parts of the salt were mixed with 100 parts of Polyether B. A glass cloth laminate was manufactured using the resin from the composition as bonding material. The laminate was prepared by embedding 8 plies of glass cloth in the resin-forming composition and curing the assembly in a press for 10 minutes at 115° C. under a pressure of 25 pounds per square inch. The resulting laminate was very strong and had a Barcol hardness of 14.

EXAMPLE 7

Another laminate was prepared from an assembly of 4 plies of glass cloth embedded in a composition containing 100 parts of Polyether A mixed with 11 parts of the acetate salt of diethylene triamine, which salt was obtained by neutralizing 1 mol of the amine with 3 mols of acetic acid. The assembly was cured in a press for 3 minutes at 140° C. under a pressure of 50 pounds per square inch. A strong laminate was obtained having a Barcol hardness of 10.

EXAMPLE 8

A series of salts were prepared by reacting 1 mol of diethylenetriamine with 2 mols of fatty acid. A fluid mixture was also prepared by adding 25 parts of dibutyl phthalate to 100 parts of Polyether C. Compositions were prepared containing diethylenetriamine in amount of an added 5% based upon the polyether as well as containing about a corresponding amount of the amine as salt thereof. The time required for the compositions to gel at room temperature of about 25° C. was determined. The results are tabulated below.

Table IV

| Amine or Salt | Added Percent Amine or Salt | Gel Time, Minutes |
|---|---|---|
| Free amine | 5 | 107 |
| Formate | 10 | 2,682 |
| Acetate | 12.5 | 3,227 |
| Butyrate | 15 | 2,674 |
| Caprylate | 20 | 3,232 |
| Laurate | 27.5 | >3,300 |
| Stearate | 37.5 | >3,300 |

EXAMPLE 9

A diethylenetriamine salt of acetic acid was prepared by adding 2 mols of acetic acid to one mol of the amine. To portions of warmed Polyether C, 5, 10 and 15 per cent of the salt was added and the compositions were tested as hot setting adhesives for metal. Aluminum blocks were employed for the test. The adhesive compositions at a temperature of about 100° C. were spread on a one-inch square surface of each of two carefully cleaned blocks with the aid of a doctor blade having a clearance of 0.005 inch. The adhesive coated surfaces of the blocks were then joined under a pressure of about 50 pounds per square inch and the joined blocks were placed in an air oven for the times and temperatures noted in the table below in order to effect cure of the adhesive compositions. The blocks were then subjected to the block shear test of the Army-Navy-Civil Committee on Aircraft Design Criteria: "Wood Aircraft Inspection and Fabrication" ANC-19 (Dec. 20, 1943) discussed in an article by R. C. Rinker and G. M. Kline, Modern Plastics, vol. 23, p. 164, 1945. The results obtained are tabulated below.

Table V

| Added Percent Salt | Curing Conditions | | Shear Strength, Lbs. per Sq. In. |
|---|---|---|---|
| | Temp., °C. | Time, Hrs. | |
| 5 | 150 | 3.5 | 720 |
| | 150 | 18 | 3,710 |
| | 200 | 3.5 | 2,010 |
| | 200 | 18 | 5,030 |
| 10 | 150 | 2 | 2,590 |
| | 150 | 3.5 | 4,280 |
| | 200 | 1 | 2,070 |
| | 200 | 3.5 | 2,970 |
| 15 | 150 | 1 | 5,200 |
| | 150 | 2 | 3,970 |
| | 200 | 1 | 1,300 |
| | 200 | 2 | 1,850 |

EXAMPLE 10

The neutral salt of diethylenetriamine and acetic acid was prepared by slowly adding 100 parts of diethylenetriamine dissolved in 260 parts of dioxane cooled to about 10° C. to 120 parts of acetic acid also dissolved in 260 parts of dioxane with stirring while keeping the temperature of the mixture below 30° C. The formed salt solidified as a mush which was macerated several times with acetone, filtered and dried. An analysis determined that the salt contained 14.9% nitrogen (theory 14.85%).

A molding powder was prepared by bringing together 100 parts of Polyether C, 8 parts of the above-described amine salt, 30 parts of alpha cellulose floc as filler and 1 part of calcium stearate as release agent. The mixture was milled on a roll mill for 5 minutes with one roll at 90°

C. and the other at 20° C. The resulting sheet was ground into small granules. A portion of the granulated powder was charged into a mold and cured to a smooth resinous disc under a pressure of about 4000 pounds per square inch at 160° C. for 5 minutes' time with the disc being removed from the mold while still hot. The cured disc was found to have a Barcol hardness of 25.

After storage of the molding powder at room temperature for about 7 months, another portion of the powder was subjected to molding under the same condiitons as described above except that the powder was compressed for only about 3 minutes' time. Again a coherent smooth disc was obtained having a Barcol hardness of 20. This demonstrated that the molding powder was resistant against resinification when stored.

EXAMPLE 11

One half mol of oleic acid was added to one mol of diethylenetriamine. The partial salt formed as a slightly viscous liquid with evolution of heat. The salt was added to a portion of a 45% stock solution of Polyether D in equal parts of xylene and methyl ether of ethylene glycol mono-acetate in amount of 9.5 parts of salt per 100 parts of the polyether. This solution became slightly more viscous after 2 days, extremely viscous after 4 days, and was found gelatinized after 4 weeks. A control sample containing the same amount of free diethylenetriamine as was present as the salt in the solution gelatinized within 48 hours.

Another salt was prepared using equimolar quantities of diethylenetriamine and oleic acid. Upon addition of 15 parts of this salt per 100 parts of the polyether to a like solution of Polyether D as described above, it was found that the resulting solution was still quite fluid after 4 days, but gelatinized within 4 weeks.

Diethylenetriamine was mixed with 2-ethylhexoic acid in a molar ratio of 1:1. Heat was liberated in forming the salt which was a viscous liquid. The salt was added to a portion of the above-described stock solution of Polyether D in amount corresponding to 4.8 parts of salt per 100 parts of the polyether. The resulting solution containing the salt became noticeably viscous after 10 days and very viscous after 14 days. Upon coating the solution on sheet steel panels soon after preparation, and baking the coated panels for 30 minutes at 150° C., protective cured films were obtained which were equal in appearance, water resistance and solvent resistance to baked films from like solutions containing the free amine rather than the salt.

We claim as our invention:

1. A composition comprising a 2-ethyl-hexoic acid salt of 2,4,6-tri(dimethylaminomethyl)phenol in admixture with a glycidyl polyether having a 1,2-epoxy equivalency greater than 1.0, the proportion of said salt in the mixture being such that there is present 0.05 to 0.85 amino nitrogen atoms per epoxide group.

2. A composition comprising a 2-ethyl-hexoic acid salt of 2,4,6-tri(dimethylaminomethyl)phenol in admixture with glycidyl polyether of a dihydric phenol having a 1,2-epoxy equivalency between 1.0 and 2.0, the proportion of said salt contained in the mixture being such that there is present 0.05 to 0.85 amino nitrogen atoms per epoxide group.

3. A composition comprising the 2-ethylhexoic acid salt of 2,4,6-tri(dimethylaminomethyl)phenol having each molecule of the amine combined with three molecules of the acid, in admixture with glycidyl polyether of 2,2-bis(4-hydroxyphenyl)propane having a 1,2-epoxy equivalency between 1.0 and 2.0, the proportion of said salt contained in the mixture being such that there is present from 0.05 to 0.85 amino nitrogen atoms per epoxide group.

4. A composition comprising the 2-ethylhexoic acid salt of 2,4,6-tri(dimethylaminomethyl)phenol having each molecule of the amine combined with three molecules of the acid, in admixture with glycidyl polyether of 2,2-bis(4-hydroxyphenyl)propane having a 1,2-epoxy equivalency between 1.0 and 2.0 and having an epoxide equivalent weight of about 170 to 500, the proportion of said salt contained in the mixture being such that there is present from about 0.1 to 0.3 amino nitrogen atoms per epoxide group.

5. A composition comprising a 2-ethyl-hexoic acid salt of 2,4,6-tri(dimethylaminomethyl)phenol in admixture with glycidyl polyether of 2,2-bis(4-hydroxyphenyl)propane having a 1,2-epoxy equivalency between 1.0 and 2.0 and having an epoxide equivalent weight of about 170 to 1000, the proportion of said salt contained in the mixture being such that there is present from 0.05 to 0.85 amino nitrogen atoms per epoxide group.

References Cited in the file of this patent

UNITED STATES PATENTS

| Number | Name | Date |
| --- | --- | --- |
| 2,444,333 | Castan | June 29, 1948 |
| 2,506,486 | Bender | May 2, 1950 |